Oct. 24, 1939.    G. O. BECKMAN    2,177,165
METHOD OF APPLYING RECAP RUBBER
Filed May 28, 1937
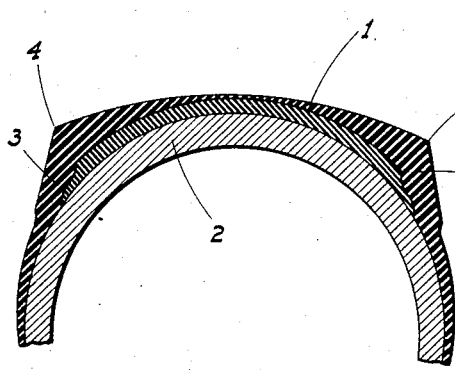
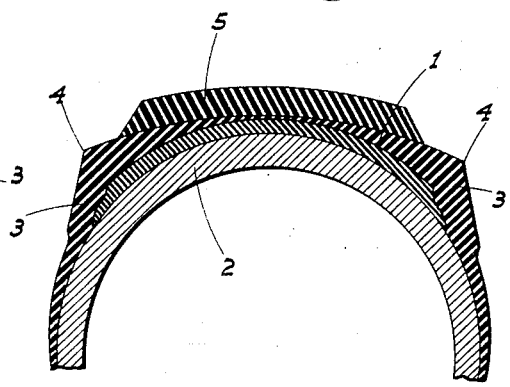
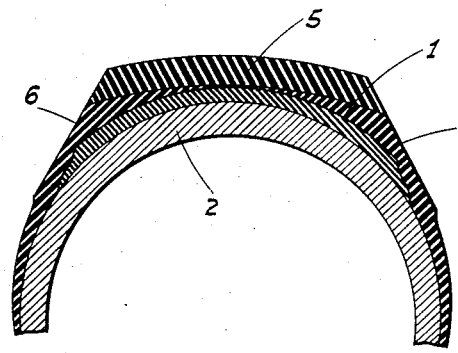
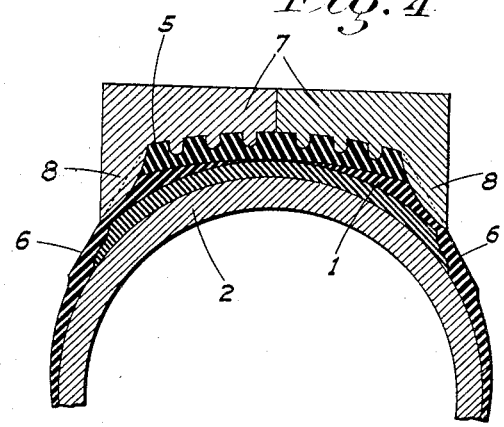
INVENTOR
G. O. Beckman
BY
ATTORNEY Patented Oct. 24, 1939

2,177,165

UNITED STATES PATENT OFFICE 2,177,165

METHOD OF APPLYING RECAP RUBBER

George O. Beckman, Lodi, Calif., assignor to Super Mold Corporation of California Application May 28, 1937, Serial No. 145,237

2 Claims. (Cl. 154—14)

This invention relates to tire recapping, my principal object being to provide a novel method of initially applying recap rubber or camelback to a tire carcass and subsequently shaping the carcass and the rubber to provide a neat appearing job so that when the vulcanizing heat and pressure is finally applied to the tire, a positive seal will be made along the line of junction of the old and new rubber and a great density of the rubber at the side edges of the tread may be obtained.

A further object of the invention is to produce a simple and inexpensive method and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a fragmentary cross section of a tire carcass showing the initial preparation of the same for the reception of the camelback.

Figure 2 is a similar view showing the camelback as applied to the carcass.

Figure 3 is a similar view showing the old tread rubber as subsequently shaped to merge into the side edges of the new rubber.

Figure 4 is a similar view showing a special form of mold-matrix applied to the tire after the latter is treated as above, to provide the desired sealing and density of the rubber.

In carrying out my method, the old tread rubber 1 of the tire carcass 2 is buffed down so as to even its surface and eliminate any pockets or bumps and at the same time roughen said surface somewhat. The buffing leaves the tread surface with substantially the same relatively flat transverse contour it attained in service, or so that the thick side shoulders 3 with their sharp edges 4 are not disturbed.

After this operation, cement is applied to the roughened surface and after the cement is left to set for the required time, a strip of new rubber or camelback 5 is placed about the tire in contact with the cemented surface. In doing this, the shoulder edges 4 are used by the operator as gauge lines, in centering the camelback on the tire.

When the camelback is thus mounted in position the shoulders 3 are removed by buffing so as to form slanting faces 6 which intersect the side edges of the camelback along the lines of its junction with the old rubber 1, and thus eliminating the relatively abrupt corners previously presented.

The tire is then ready for vulcanizing and is placed in a mold such as that shown in the copending application of E. A. Glynn, Serial No. 117,304, filed December 23, 1906, now Patent No. 2,147,339 of February 14, 1939, and which is assigned to the assignee of this application. This mold includes continuous matrix sections 7, shaped in cross section to engage the outer face of the rubber 5 from side to side and formed with inwardly projecting side skirts 8 whose inner faces are convexly curved. The depth of the skirts is such that their inner edges engage the sloping faces 6 of the old rubber intermediate the ends thereof and outwardly of the plane of the rubber 5. The convex faces of the skirts press in the faces 6, including the side edges of the rubber 5, to impart a concave curvature thereto which gives a neat appearance to the finished tire. More important than this, however, this pressing in of the the rubber forces the same up into the side corners of the matrix, making the edges or corners of the tread rubber very dense as is desired. Further, since the side faces of the new and old tread rubber are initially straight as shown in Fig. 3, this convexity of the skirts causes the lateral pressure on the rubber to be applied with decreasing intensity in both directions from the lines of junction of the old and new rubber. Also this squeezing in of the rubber imparts the desired density to the faces 6 and a very firm seal is made between the old and new rubber at the junction of the same on the outside.

From the foregoing description it will be readily seen that I have produced such a method as substantially fulfills the objects of the invention as set forth herein.

While this specification sets forth in detail the present and preferred construction of the method, still in practice such deviations from such detail may be resorted to as do not form a departure from the spirit of the invention, as defined by the appended claims.

Having thus described my invention, what I claim as new and useful and desire to secure by Letters Patent is:

1. The method of recapping a tire comprising mounting a strip of new recap rubber on the old tread rubber of the tire, removing old rubber to the sides of the new rubber to eliminate any corners at the junction of the sides of the new rubber with the old rubber, placing the tire in a heated mold, and with the heat, applying lateral pressure against the sides of the new rubber and the adjacent portions of the old rubber to inwardly deflect the same between the outer corners of the new rubber and predetermined points on the old rubber.

2. The method of recapping a tire comprising mounting a strip of new recap rubber on the old tread rubber of the tire, removing old rubber to the sides of the new rubber to eliminate any corners at the junction of the sides of the new rubber with the old rubber, placing the tire in a heated mold, and with the heat, applying lateral pressure against the sides of the tire at and with decreasing intensity in both directions radially of the tire from the lines of junction of the new with the old rubber at the side edges thereof.

GEORGE O. BECKMAN.